US011430487B2

(12) United States Patent
Yoshikawa et al.

(10) Patent No.: US 11,430,487 B2
(45) Date of Patent: Aug. 30, 2022

(54) DISPLAY CONTROL APPARATUS AND CONTROL METHOD FOR CONTROLLING THE SAME

(71) Applicant: CANON KABUSHIKI KAISHA, Tokyo (JP)

(72) Inventors: Akio Yoshikawa, Kanagawa (JP); Ayumi Sato, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/392,855

(22) Filed: Aug. 3, 2021

(65) Prior Publication Data
US 2022/0044707 A1 Feb. 10, 2022

(30) Foreign Application Priority Data
Aug. 6, 2020 (JP) .............................. JP2020-134128

(51) Int. Cl.
*H04N 5/775* (2006.01)
*G11B 27/10* (2006.01)
*G11B 27/34* (2006.01)
*H04N 5/783* (2006.01)
*G06F 3/0488* (2022.01)

(52) U.S. Cl.
CPC ............ *G11B 27/102* (2013.01); *G11B 27/34* (2013.01); *G06F 3/0488* (2013.01)

(58) Field of Classification Search
CPC ..... G11B 27/031; G11B 27/34; G11B 27/327; G11B 27/102; G06F 3/0488
USPC ................ 386/230, 343, 350, 349, 344, 353
See application file for complete search history.

(56) References Cited

U.S. PATENT DOCUMENTS

2015/0248919 A1 9/2015 Homma et al.

FOREIGN PATENT DOCUMENTS

| JP | 2005504448 A | * | 2/2005 |
| JP | 2318120 C | * | 6/2009 |
| JP | 4371554 B2 | * | 11/2009 |
| JP | 4388701 B2 | * | 12/2009 |
| JP | 4803859 B2 | * | 10/2011 |
| JP | 2017201821 A | | 11/2017 |
| WO | 2008/030780 A1 | | 3/2008 |
| WO | 2019/124921 A1 | | 6/2019 |

* cited by examiner

*Primary Examiner* — Robert Chevalier
(74) *Attorney, Agent, or Firm* — Canon U.S.A., Inc. IP Division

(57) ABSTRACT

A display control apparatus that performs control, where a content is reproduced such that, when a reproduction position of the content is changed to a first range from an end of the content by an operation of a user on an operation unit, the reproduction is continued from a position where the change is made, and when the reproduction position of the content reaches the end of the content, the reproduction automatically transitions to reproduction of a next content, and when the reproduction position of the content is changed to a second range from the end of the content different from the first range by an operation of the user on the operation unit, and even when the reproduction position of the content reaches the end of the content, the reproduction does not automatically transition to the reproduction of the next content and the reproduction of the content is paused.

18 Claims, 9 Drawing Sheets

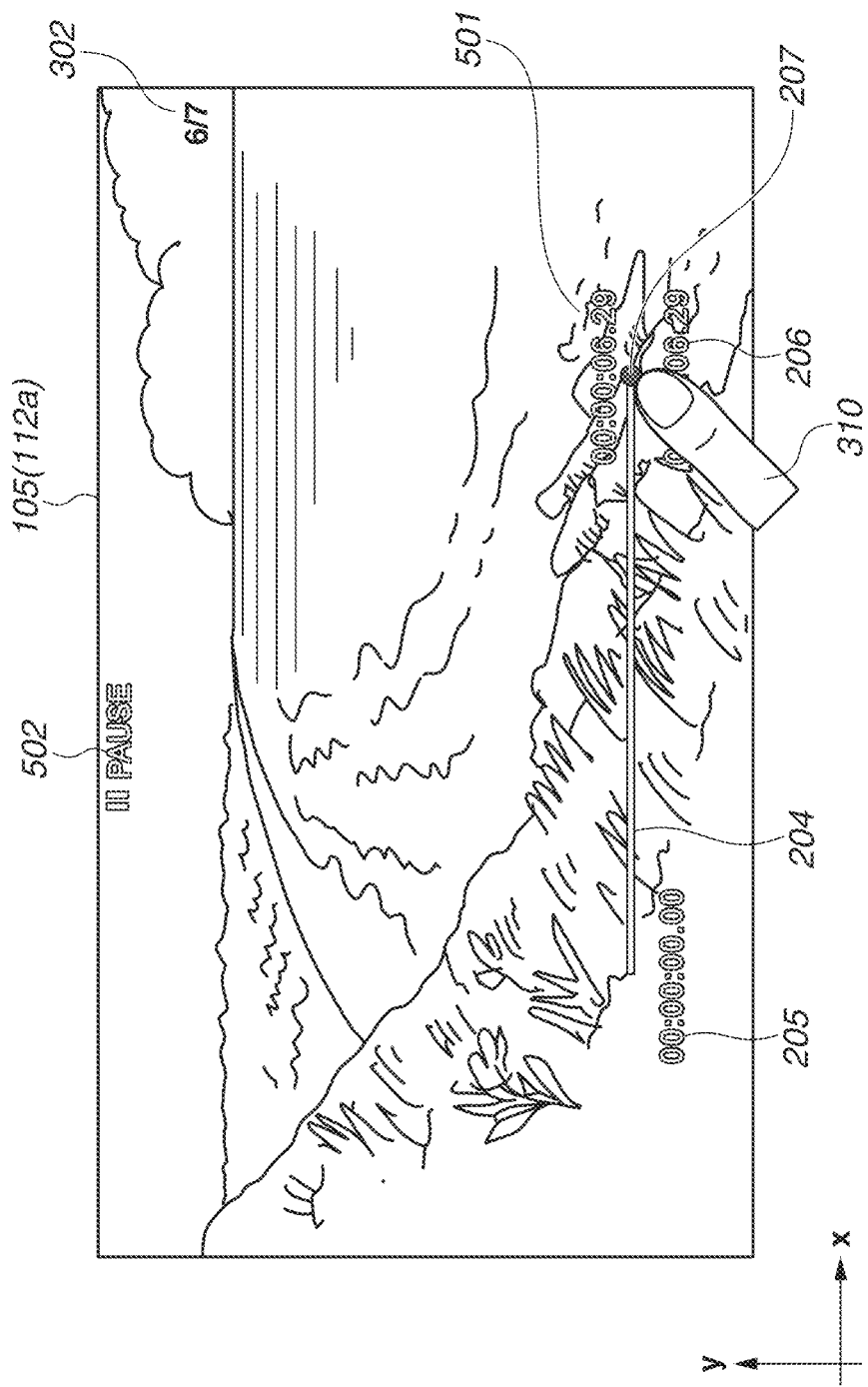

DISPLAY CONTROL APPARATUS AND CONTROL METHOD FOR CONTROLLING THE SAME

BACKGROUND OF THE INVENTION

Field of the Invention

The present invention relates to a technique for control when a plurality of contents is continuously reproduced.

Description of the Related Art

Japanese Patent Application Laid-Open No. 2017-201821 discusses a progress bar that, when a content is reproduced, indicates a reproduction position of the reproduced content. In a state where the content is being reproduced, if a touch-down is performed on the progress bar, and a movement is made on the progress bar by a touch move operation, and a touch-up is performed at a certain position, a part of the content corresponding to the position where the touch-up is performed is reproduced. In these days, a technique for, if there is a plurality of contents, in response to ending a content that is currently being reproduced, automatically reproducing a next content is widely known.

According to Japanese Patent Application Laid-Open No. 2017-201821 and the recent technique, however, when an operation is performed on a progress bar by a touch move operation, and if a touch-up is performed near the end of the progress bar, a content that is being reproduced may immediately end and transition to the reproduction of a next content against a user's intention. This is not user-friendly to the user who wishes to confirm the content that is being reproduced.

SUMMARY OF THE INVENTION

The present invention is directed to a technique for preventing transition of a content against a user's intention, and improving usability for the user.

According to an aspect of the present invention, a display control apparatus includes at least one memory and at least one processor which function as a reproduction unit configured to reproduce a content and a control unit configured to, in a state where the content is reproduced, perform control so that, in a case where a reproduction position of the content is changed to a first range from an end of the content by an operation of a user on an operation unit, the reproduction is continued from a position where the change is made, and, in a case where the reproduction position of the content reaches the end of the content, the reproduction automatically transitions to reproduction of a next content, and, in a case where the reproduction position of the content is changed to a second range from the end of the content different from the first range by an operation of the user on the operation unit, and even in a case where the reproduction position of the content reaches the end of the content, the reproduction does not automatically transition, to the reproduction of the next content and the reproduction of the content is paused.

Further features of the present invention will become apparent from the following description of exemplary embodiments with reference to the attached drawings.

BRIEF DESCRIPTION OF THE DRAWINGS

FIG. 5 is a diagram illustrating a second example of display in a case where the reproduction position of the content is changed by the user operation.

DESCRIPTION OF THE EMBODIMENTS

An exemplary embodiment of the present invention will be described in detail below with reference to the accompanying drawings.

It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment. Each of the embodiments of the present invention described below can be implemented solely or as a combination of a plurality of the embodiments or features thereof where necessary or where the combination of elements or features from individual embodiments in a single embodiment is beneficial.

With reference to the drawings, operations of exemplary embodiments of the present invention will be described below.

Figure 1:
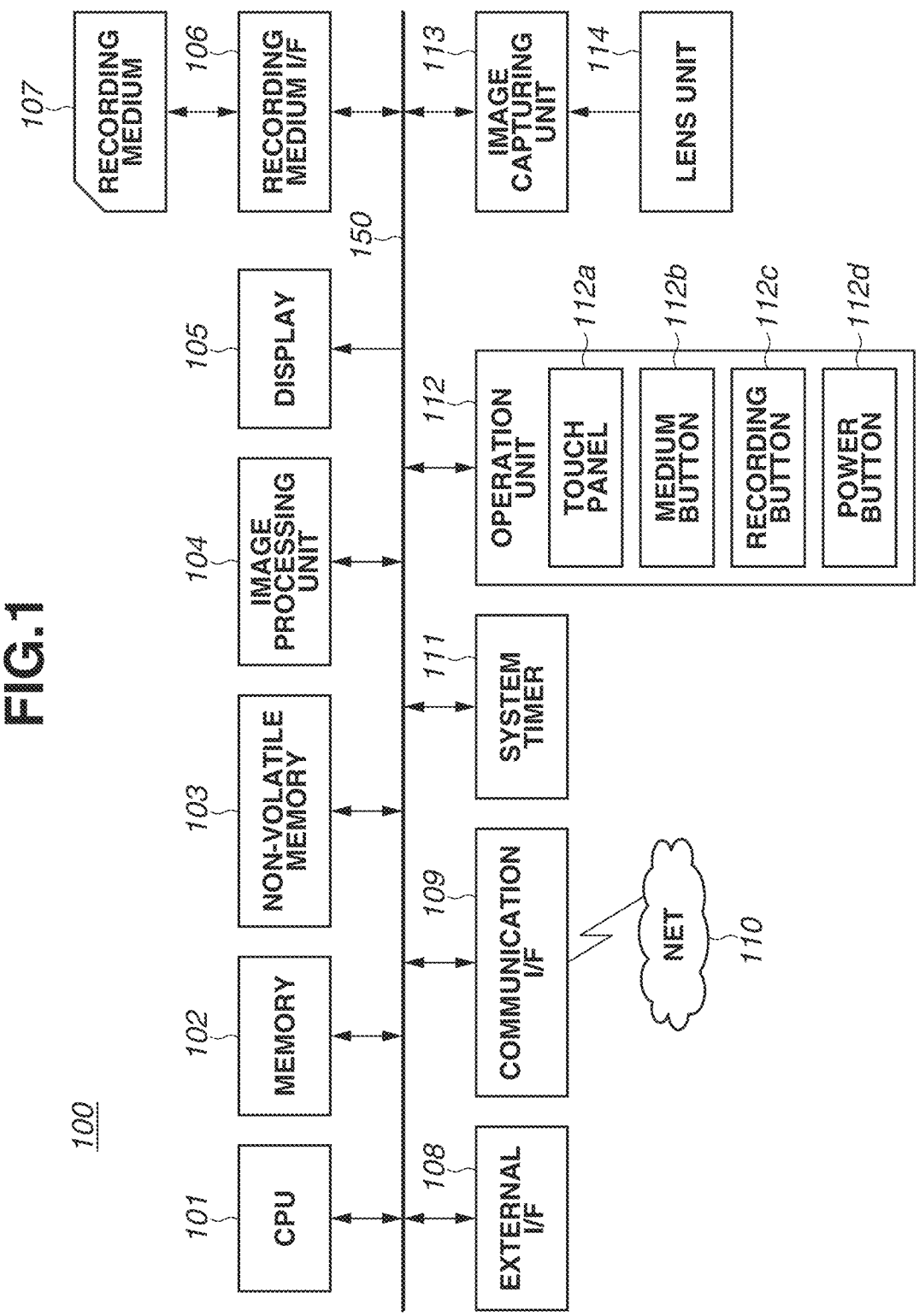
FIG. 1 is a block diagram illustrating a configuration of a digital camera as an example of a display control apparatus.

FIG. 1 is a block diagram illustrating an example of a configuration of a digital camera 100 as an example of a display control apparatus according to an exemplary embodiment. To an internal bus 150, a central processing unit (CPU) 101, a memory 102, a non-volatile memory 103, an image processing unit 104, a display 105, a recording medium interface (I/F) 106, an external I/F 108, a communication I/F 109, a system timer 111, an operation unit 112, and an image capturing unit 113 are connected. A recording medium 107 is connected to the internal bus 150 via the recording medium I/F 106, and a lens unit 114 is connected to the internal bus 150 via the image capturing unit 113. The components connected to the internal bus 150 can exchange data with each other via the internal bus 150.

The memory 102 is composed, for example, of a random-access memory (RAM) (a volatile memory using semiconductor elements). For example, according to a program stored in the non-volatile memory 103, the CPU 101 controls the components of the digital camera 100 using the memory 102 as a work memory.

The non-volatile memory 103 stores image data, sound data, other types of data, and various programs for the operation of the CPU 101. The non-volatile memory 103 is composed, for example, of a hard disk (HD) or a read-only memory (ROM).

Based on the control of the CPU 101, the image processing unit 104 performs various types of image processing on image data stored in the non-volatile memory 103 or the recording medium 107, a video signal acquired via the external I/F 108, or image data acquired via the communication I/F 109. The image processing performed by the image processing unit 104 includes an analog-to-digital (A/D) conversion process, a digital-to-analog (D/A) conversion process, and an encoding process, a compression process, a decoding process, an enlargement/reduction process (resizing), a noise reduction process, and a color conversion process on the image data. The image processing unit 104 may be composed of a dedicated circuit block for performing particular image processing. Alternatively, depending on the type of image processing, the CPU 101 can also perform the image processing according to a program without using the image processing unit 104.

Based on control of the CPU 101, the display 105 displays an image or a graphical user interface (GUI) screen, which forms a GUI. According to a program, the CPU 101 generates a display control signal and controls the components of the digital camera 100 to generate a video signal to be displayed on the display 105 and output the video signal to the display 105. The display 105 displays an image based on the output video signal. The digital camera 100 itself may include only an interface for outputting a video signal to be displayed on the display 105, and the display 105 may be composed of an external monitor (television).

The recording medium 107 such as a memory card or a hard disk is attachable to the recording medium I/F 106. Based on the control of the CPU 101, the recording medium I/F 106 reads and writes data from and to the attached recording medium 107.

The external I/F 108 is an interface for connecting to an external device via a cable for wired connection or wirelessly, and inputting and outputting a video signal and a sound signal.

The communication I/F 109 is an interface for communicating with the external device or the Internet 110 and transmitting and receiving various types of data such as a file and a command. The communication I/F 109 can also connect to a wireless local area network (LAN) or the Internet. The communication I/F 109 can communicate with the external device also using Bluetooth® or Bluetooth® Low Energy. The communication I/F 109 can transmit an image (including a live view image) captured by the image capturing unit 113 or an image stored in the recording medium 107 to the external device and also receive an image or various other pieces of information from the external device. A moving image uploaded onto the Internet 110 can be acquired via the communication I/F 109 and displayed on the display 105 or saved in the recording medium 107. For example, there is a method of downloading all data regarding the moving image on the Internet 110 once, saving the data in the memory 102, and then displaying the moving image. There is also a method of downloading a part of data regarding the moving image on the Internet 110 and acquiring the remaining data as needed during the reproduction of the downloaded moving image (referred to as "streaming reproduction").

The system timer 111 is a time measurement unit that measures the time used for various types of control and the time of a built-in clock.

The operation unit 112 is an input device for receiving a user operation and includes a touch panel 112a, a medium button 112b, a recording button 112c, and a power button 112d. The touch panel 112a is a touch operation member capable of detecting a touch operation and can be formed integrally with the display 105. The medium button 112b is an operation button used to switch between a recording mode for recording a moving image and a reproduction mode for reproducing a recorded or acquired moving image. The medium button 112b is pressed in an image capturing mode, whereby the image capturing mode transitions to the reproduction mode, and a list (index) of moving images recorded in the recording medium 107 is displayed on the display 105. The recording button 112c is an operation member used to give an instruction to start or stop the capturing (recording) of a moving image or a still image. If the recording button 112c is operated, the CPU 101 starts a series of recording processing operations from the reading of a signal from the image capturing unit 113 to the writing of moving image data into the recording medium 107. The power button 112d is an operation member used to switch the turning on and off of the digital camera 100. No matter which mode or state the digital camera 100 is in, the digital camera 100 is turned off if the power button 112d is operated. If the digital camera 100 is turned on, the digital camera 100 starts in an image capturing standby state, regardless of the state before the digital camera 100 is previously turned off. Each of the medium button 112b and the recording button 112c may be a physical button which is placed in the digital camera 100 and on which a pressing operation can be performed, or may be an icon which is displayed on the touch panel 112a and on which a touch operation can be performed.

The touch panel 112a is an operation member (touch operation member) that can be integrally formed with the display 105 and detect contact with the display 105. For example, the touch panel 112a is configured not to hinder the display of the display 105 with the transmittance of light. Then, the touch panel 112a is attached to an upper layer of the display surface of the display 105. Then, input coordinates on the touch panel 112a are associated with display coordinates on the display 105. With this configuration, it is possible to provide a GUI as if a user can directly operate a screen displayed on the display 105. A system control unit 50 can detect the following operations on the touch panel 112a (the following operations on an operation surface of display 105) or the following states.

The state where a finger or a pen that has not touched the touch panel 112a newly touches the touch panel 112a, i.e., the start of a touch (hereinafter, referred to as a "touch-down").

The state where the finger or the pen touches the touch panel 112a (hereinafter, referred to as a "touch-on").

The state of moving the finger or the pen while the finger or the pen keeps touching the touch panel 112a (hereinafter, referred to as a "touch move").

The state of separating from the touch panel 112a the finger or the pen having touched the touch panel 112a, i.e., the end of a touch (hereinafter referred to as a "touch-up").

The state where nothing touches the touch panel 112a (hereinafter, referred to as a "touch-off").

If a touch-down is detected, simultaneously, a touch-on is also detected. After the touch-down, normally, the touch-on continues to be detected unless a touch-up is detected. A touch move is detected also in the state where the touch-on is detected. Even if the touch-on is detected, but if the touch position does not move, a touch move is not detected. After a touch-up of all the fingers or the pen having touched the touch panel 112a is detected, a touch-up is detected.

The system control unit 50 is notified via an internal bus of these operations and states and the position coordinates where the finger or the pen touches the touch panel 112a.

Based on the notified information, the system control unit 50 determines what operation is performed on the touch panel 112a. In a case of a touch move, the system control unit 50 can also determine, based on changes in the position coordinates, the moving direction of the finger or the pen moving on the touch panel 112a for each of the vertical and horizontal components on the touch panel 112a. If the user continuously performs a touch-down, a certain touch move, and a touch-up on the touch panel 112a, the user is regarded as drawing a stroke. The operation of quickly drawing a stroke is referred to as a "flick". A flick is the operation of quickly moving the finger by some distance while the finger keeps touching the touch panel 112a, and then separating the finger from the touch panel 112a immediately after the quick movement. In other words, a flick is the operation of quickly tracing the touch panel 112a with the finger in a flipping manner. If a touch move performed by a predetermined distance or more at a predetermined speed or more is detected, and a touch-up is detected immediately after the touch move, the system control unit 50 can determine that a flick is performed. If a touch move performed by a predetermined distance or more at less than a predetermined speed is detected, the system control unit 50 determines that a drag is performed. Further, a touch operation of simultaneously touching a plurality of places (e.g., two points) and bringing the touch positions close to each other is referred to as a "pinch-in", and a touch operation for separating the touch positions from each other is referred to as a "pinch-out". The pinch-out and the pinch-in are collectively referred to as a "pinch operation" (or simply as a "pinch"). The touch panel 112a may be a touch panel of any of various types such as a resistive type, a capacitive type, a surface acoustic wave type, an infrared type, an electromagnetic induction type, an image recognition type, and a photosensor type. Although there are a method for detecting the presence of a touch based on the presence of the contact of the finger or the pen on the touch panel 112a, and a method for detecting the presence of a touch based on the presence of the approach of the finger or the pen to the touch panel 112a depending on the type, either method can be used.

A moving image refers to an image that moves, and generally includes several tens to several hundreds of still images per second. Each of these several tens to several hundreds of still images per second is referred to as a "frame". The density of still images per time is referred to as a "frame rate". As a unit representing the number of images per second, frames per second (fps) is used. For example, if the frame rate is 30 fps, the moving image includes 30 still images per second. If the frame rate is 120 fps, the moving image includes 120 still images per second. Thus, the greater the number of still images per second is, the smoother the moving image is.

The image capturing unit 113 is an image sensor composed of a charge-coupled device (CCD) sensor or a complementary metal-oxide-semiconductor (CMOS) sensor, which converts an optical image of an object obtained through the lens unit 114 (described below) into an electric signal. An analog signal output from the image capturing unit 113 is converted into a digital signal, and the signal is transmitted to the CPU 101 and the image processing unit 104. The lens unit 114 is a lens group including a zoom lens and a focus lens. The lens unit 114 may be an interchangeable imaging lens, or may be included in (fixed to) the digital camera 100.

A timecode (TC) refers to a time that can be generated by a timecode generator and recorded in the recording medium 107 together with a video image (moving image), and assists the management and the synchronization of the video and a sound. The presence of the timecode enables the specifying of a position in the video image to be reproduced. The timecode may be generated by a built-in timecode generator, or the timecode may be generated by an external source, received, and synchronized. The timecode is mainly represented by an 8-digit number string (hours: minutes: seconds: frames). The user can set any initial value (start value of count up) to the timecode. The timecode can be assigned as metadata to the recording medium 107 together with the video image. Not only the timecode but also the recording date and time of the video image and the location where the video is recorded are also assigned as metadata to the recording medium 107. According to the fact that the assigned recording dates and times of video images are within a predetermined period or the assigned locations of video images are within a predetermined distance, it can also be determined that the video images are related video images.

Next, with reference to FIG. 2 to FIGS. 8A and 8B, the digital camera 100 as an example of the display control apparatus according to the present exemplary embodiment is described.

Figure 2:
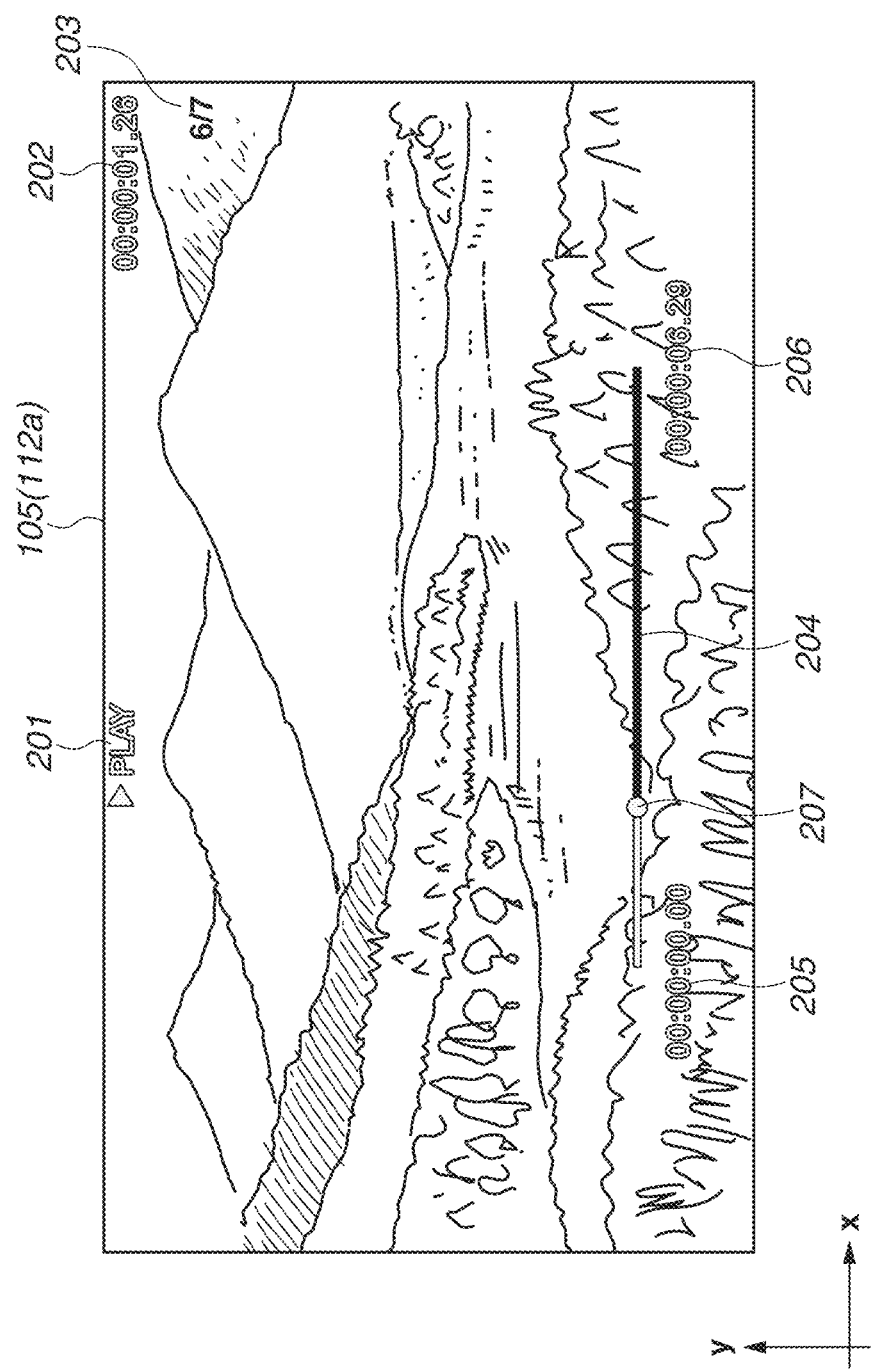
FIG. 2 is a diagram illustrating an example of display in a case where a reproduction state of a content is a reproduction-in-progress state.

FIG. 2 illustrates an example of display performed on the display 105 in a case where the current reproduction state of a moving image as an example of a content is a reproduction-in-progress state in the digital camera 100 according to the present exemplary embodiment. A display 201 is a state display indicating that a moving image displayed on the display 105 is being reproduced. For example, when the reproduction state of the moving image is a reproduction-in-progress state, the display 201 indicates "PLAY". When the reproduction state of the moving image is a pause state, the display 201 indicates "PAUSE". A time 202 indicates the time elapsed from when the reproduction of a beginning frame of the moving image displayed on the display 105 is started among moving images saved in the recording medium 107. Similar to the timecode, the time 202 is displayed in the "hours: minutes: seconds: frames" format. In FIG. 2, it is understood that 1 second and 26 frames elapse since the start of the reproduction of the moving image. In the present exemplary embodiment, as the time 202, a timecode described below may be displayed. A display 203 is an item representing the sequential number of the moving image that is being displayed on the display 105 among all the moving images saved in the recording medium 107. In FIG. 2, the display 203 indicate that seven moving images are saved in the recording medium 107, and the moving image that is being displayed on the display 105 is the sixth moving image among the seven moving images. The present exemplary embodiment is not limited to this, and can also be applied to a case where a user attempting to ultimately create, through editing, a single long-term moving image (e.g., a movie) records several chapters. For example, the display 203 can be considered as indicating the sixth chapter among seven chapters. A seek bar 204 is a bar display indicating the entire length of the moving image displayed on the display 105. A timecode 205 indicates the timecode of the beginning of the seek bar 204. A timecode 206 indicates the timecode of the end of the seek bar 204. A pointer 207 indicates a reproduction position representing which position on the seek bar 204 a display frame displayed on the display 105 corresponds to. The timecode 205, the timecode 206, and the pointer 207 may not always be displayed, and may be displayed only in a case where the user performs a touch operation on the touch panel 112a or a movement operation for moving the pointer 207. In the present exemplary embodiment, the seek bar 204 and the pointer 207 are referred to as an "indicator indicating the reproduction position of the moving image". As illustrated in FIG. 2, an already reproduced portion of the moving image from the beginning of the seek bar 204 to the position of the pointer 207 is differentiated in color from a portion that has not yet been reproduced. In this way, also in a case where the pointer 207 is not temporarily displayed, the user can visually confirm the reproduction position. Further, the user can recognize what proportion of the entire moving image that is being displayed on the display 105 has already been reproduced.

Figure 8A:
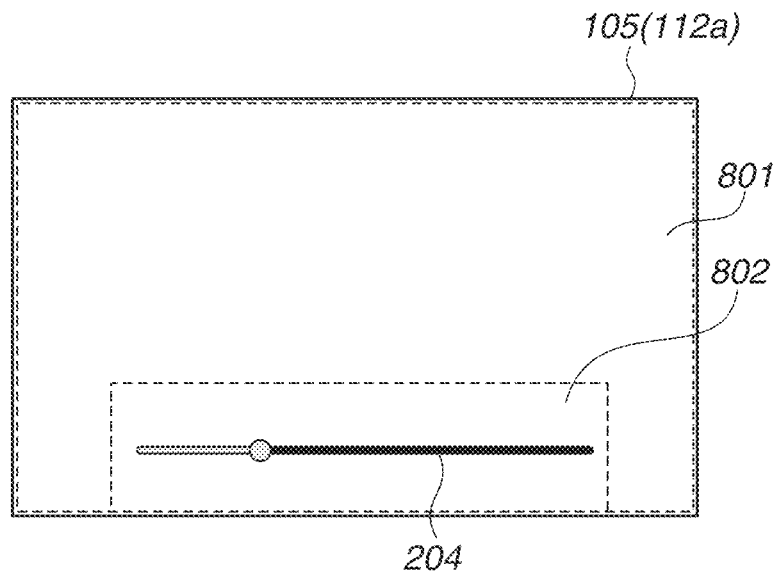
FIGS. 8A and 8B are diagrams illustrating a response area for a touch operation in a touch panel.
Figure 8B:
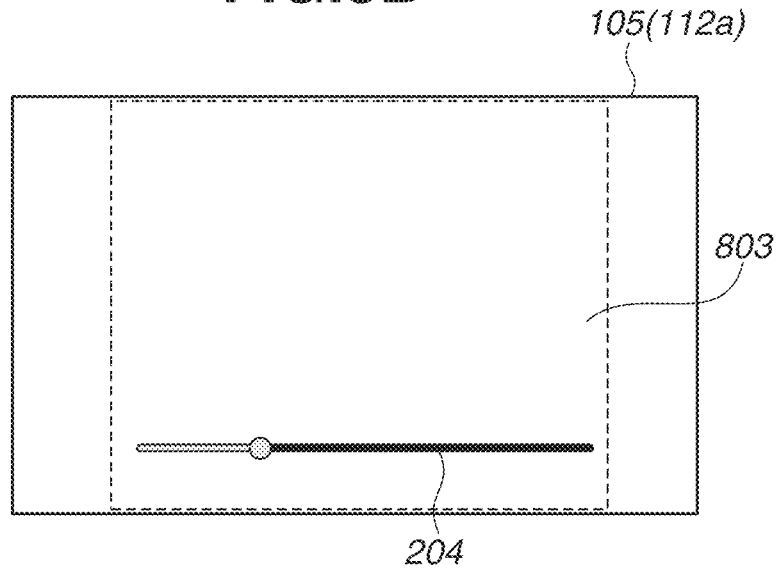

In the seek bar 204, the user performs a touch-down on a bar area 802 in FIG. 8A and performs a touch move in a movement area 803, and thereby can change the reproduction position of the moving image indicated by the pointer 207. Thus, the display frame of the moving image displayed on the display 105 changes. In FIG. 2, the timecode 205 indicates 0 seconds and 0 frames, and the timecode 206 indicates 6 seconds and 29 frames. As described above, each timecode can be set to any initial value by the user. In the present exemplary embodiment, the indicator is displayed in a superimposed manner on the moving image displayed on the display 105. The indicator may not be a bar display as in the seek bar 204 or may not be an indicator always displayed together with the moving image on the display 105 so long as the entire length and the reproduction position of the moving image can be visually confirmed. The display position of the indicator is not limited to a position illustrated in FIG. 2, either.

Figure 3:
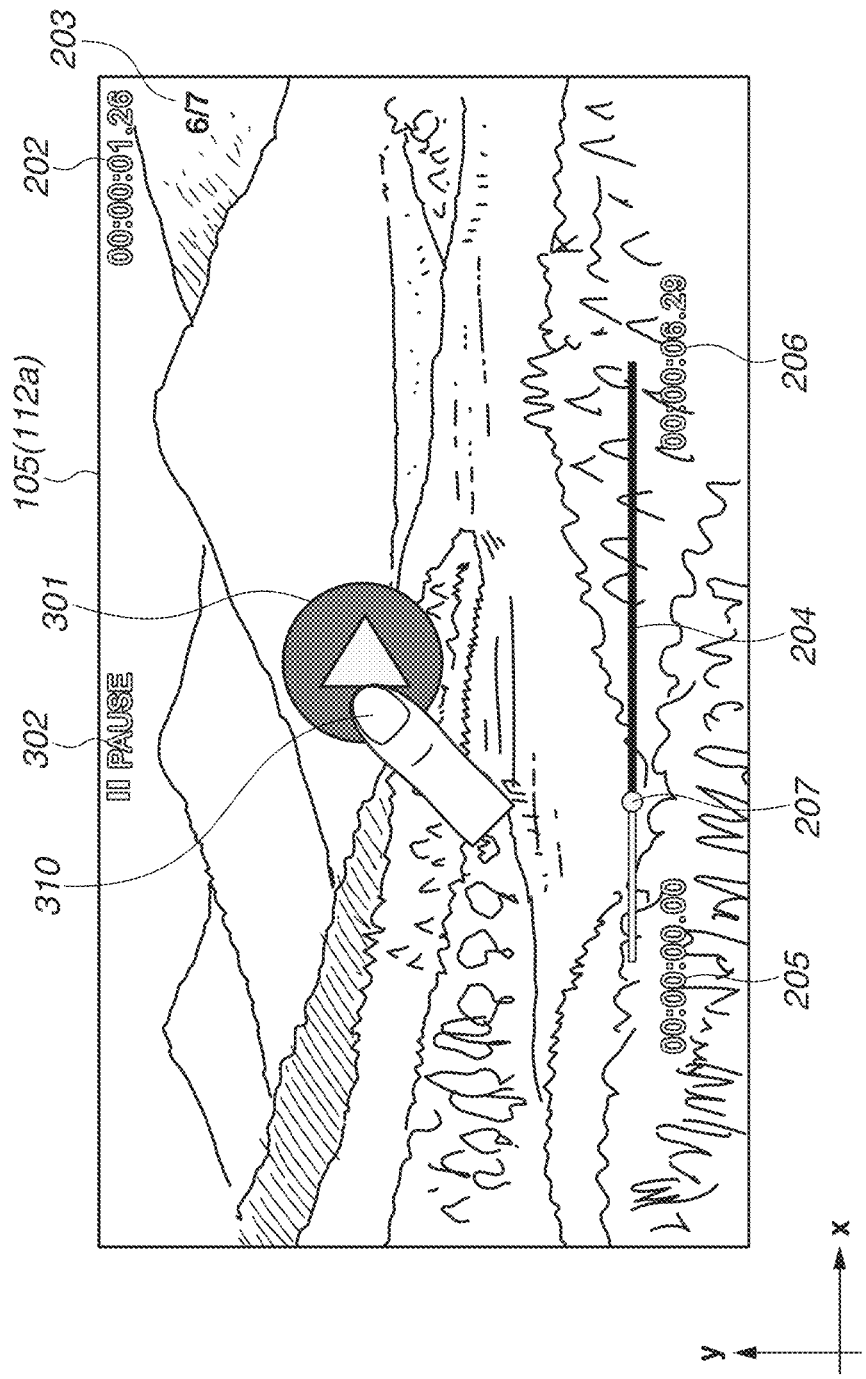
FIG. 3 is a diagram illustrating an example of display in a case where the reproduction state of the content is a pause state.

FIG. 3 illustrates an example of display in a case where the moving image as an example of the content is being paused in the digital camera 100 as an example of the display control apparatus according to the present exemplary embodiment. In FIG. 3, the time 202 indicates that the reproduction state is the pause state and the display frame displayed on the display 105 corresponds to 1 second and 26 frames. An icon 301 indicates that the reproduction state can be caused to transition from the pause state to the reproduction-in-progress state. Similar to the seek bar 204 of the indicator, the icon 301 is displayed in a superimposed manner on the moving image and displayed only when the reproduction state is the pause state. The user performs a touch operation on the icon 301, for example, with a finger 310 and thereby can change the reproduction state of the content from the pause state to the reproduction-in-progress state. In response to a touch-down on the icon 301, the display color of the icon 301 changes. In response to a touch-up from the icon 301, the reproduction state transitions from the pause state to the reproduction-in-progress state, and the icon 301 is hidden. In the present exemplary embodiment, in response to a touch-down on the icon 301, the icon 301 is changed from gray to orange. The change in the display form of the icon 301, however, is not limited to this so long as the user can visually confirm the change. Alternatively, the shape of the icon 301 may change, or the icon 301 may be displayed three-dimensionally. Yet alternatively, only a triangular figure displayed at the center of the icon 301 may be displayed at a time other than when a touch-down is performed, and a circle may be displayed together with the triangular figure only when a touch-down is performed. A display 302 indicates "PAUSE", and similar to the display 201 in FIG. 2, represents the state of the moving image displayed on the display 105. In FIG. 3, it is indicated that the reproduction state of the moving image is the pause state.

Figure 4:
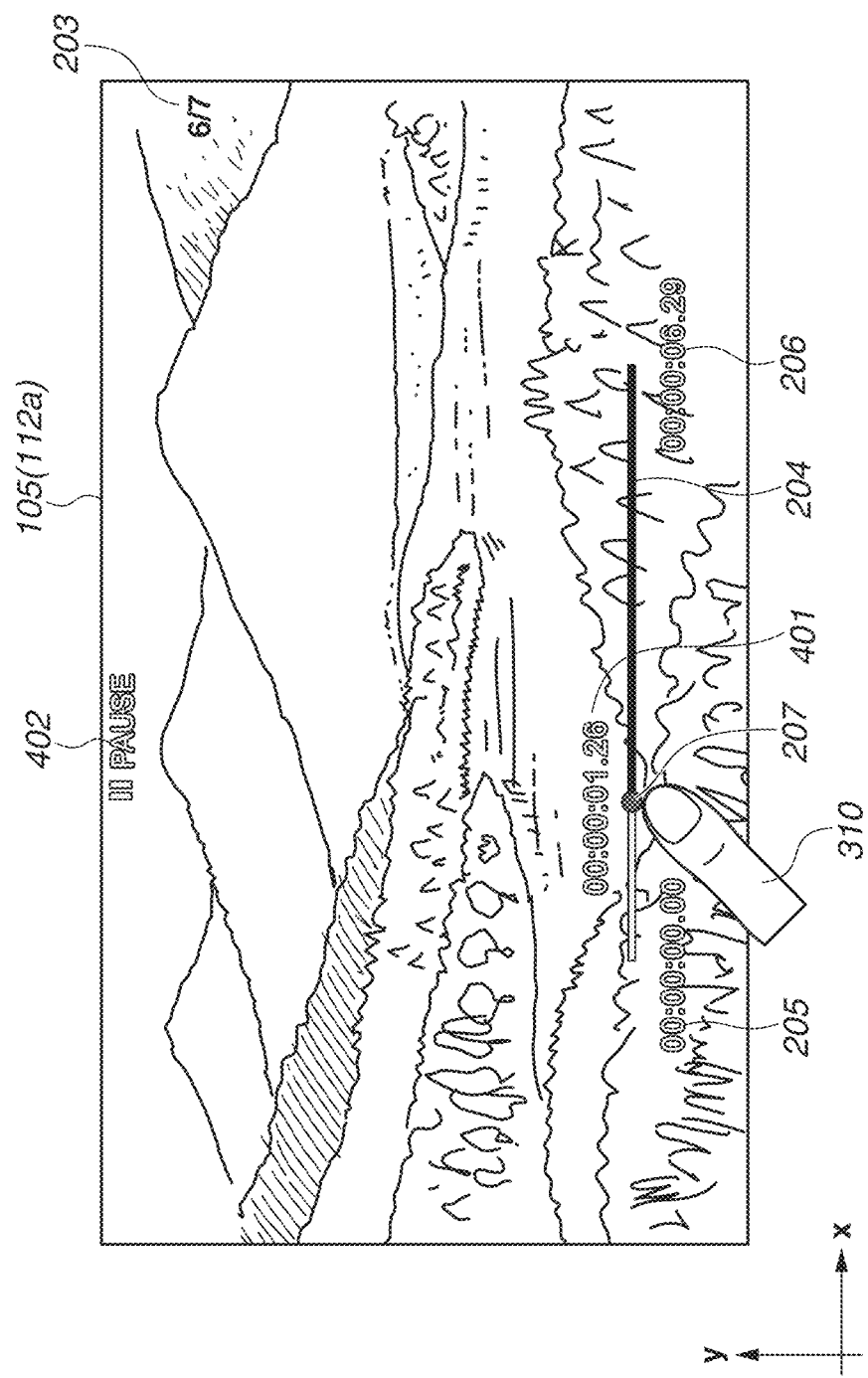
FIG. 4 is a diagram illustrating a first example of display in a case where a reproduction position of the content is changed by a user operation.

FIG. 4 illustrates an example of display performed on the display 105 in a state where an area where an operation is determined as a touch operation on the seek bar 204 (bar area 802 in FIG. 8A) is touched with the finger 310 in the digital camera 100 as an example of the display control apparatus according to the present exemplary embodiment. The user performs a touch-down on the bar area 802, whereby the state of the moving image transitions to a reproduction position moving state. By a touch-down on the display position of the pointer 207 or a touch-down on the inside of the bar area 802, the pointer 207 enters the reproduction position moving state, and the pointer 207 moves to a position corresponding to the touch-down position. A timecode 401 is the timecode of the display position of the pointer 207. A method for calculating the timecode 401 will be described below in step S621 in a control flowchart in FIG. 6. Similar to the display 201 in FIG. 2 and the display 302 in FIG. 3, a display 402 indicates the state of the moving image. In the present exemplary embodiment, when the reproduction state is the reproduction position moving state, the display 402 indicates "PAUSE" representing the pause state. The display 402 may be a display that can be distinguished from the display of the reproduction state indicating the reproduction-in-progress state and the pause state.

FIG. 5 illustrates an example of display performed on the display 105 in a case where the user performs a touch-down on the bar area 802 and performs a touch move operation in FIG. 4. A timecode 501 has a function similar to that of the timecode 401 and indicates that the position of the pointer 207 is 6 seconds and 29 frames. Since the timecodes 206 and 501 match each other, it is understood that the pointer 207 reaches the end of the seek bar 204 by the touch move operation of the user. A method for determining whether the pointer 207 reaches the end of the seek bar 204 by the touch move operation of the user will be described below in step S628 in FIG. 6.

A method for calculating the elapsed time indicated by the timecode 501 based on the display position of the pointer 207 on the seek bar 204 is described. The left end of the seek bar 204 has an x-coordinate of the beginning of the seek bar 204, and the size of the seek bar 204 is the size in an x-direction of the entire seek bar 204. The touch position of the user is set to an x-coordinate of the touch, the elapsed time of the timecode 205 is set to a beginning timecode value, and the elapsed time of the timecode 206 is set to an end timecode value.

In the present exemplary embodiment, a description is given of a control process when the user reproduces the moving image as an example of the content in the digital camera 100. FIG. 6 is a control flowchart for the reproduction of the moving image in a moving image reproduction mode. This control process is achieved by the CPU 101 loading a program stored in the non-volatile memory 103 into the memory 102 and executing the program.

Figure 6A:
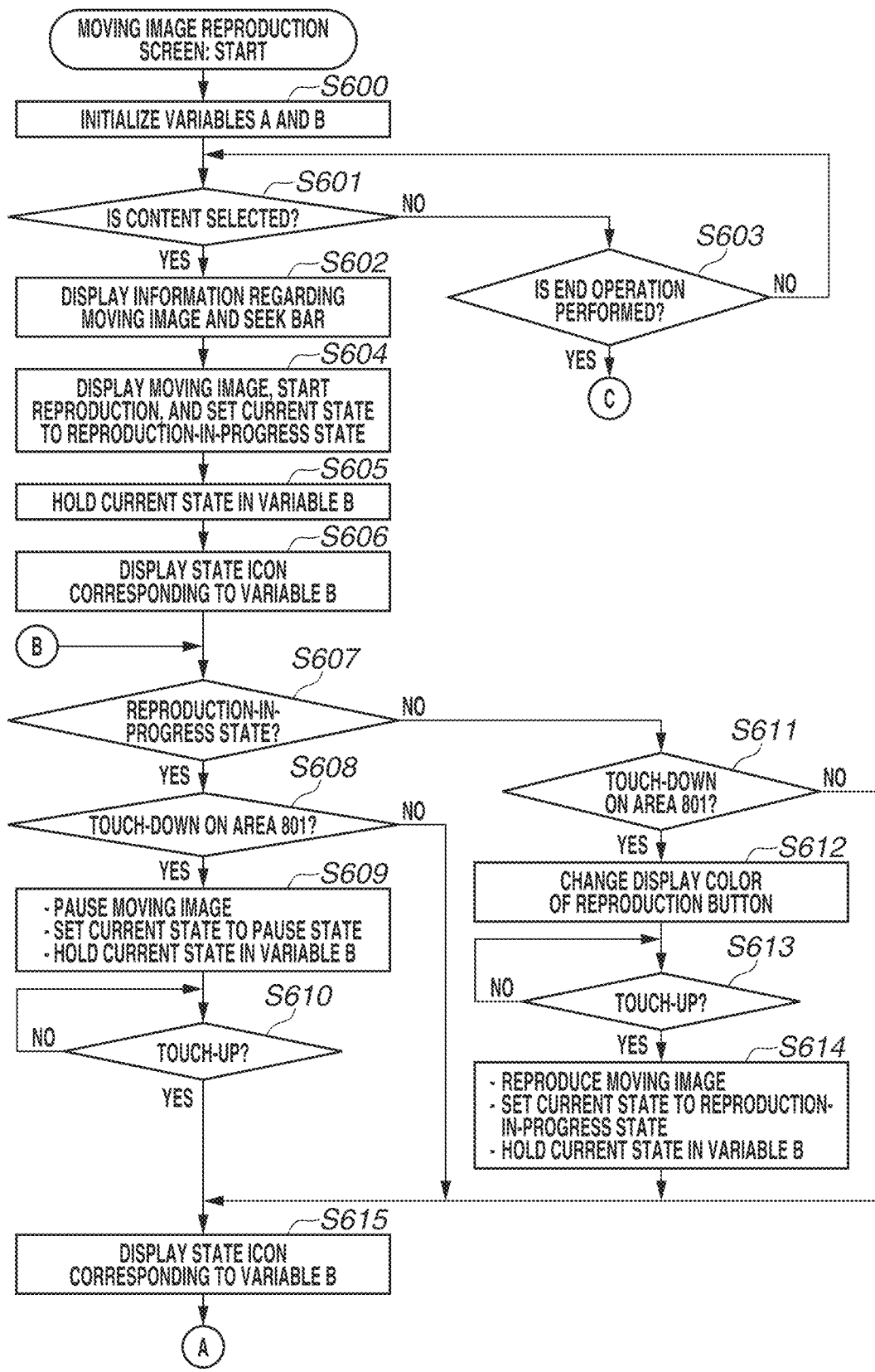
FIG. 6 (consisting of FIGS. 6A and 6B) is a flowchart illustrating control processing regarding reproduction of the content.
Figure 6B:
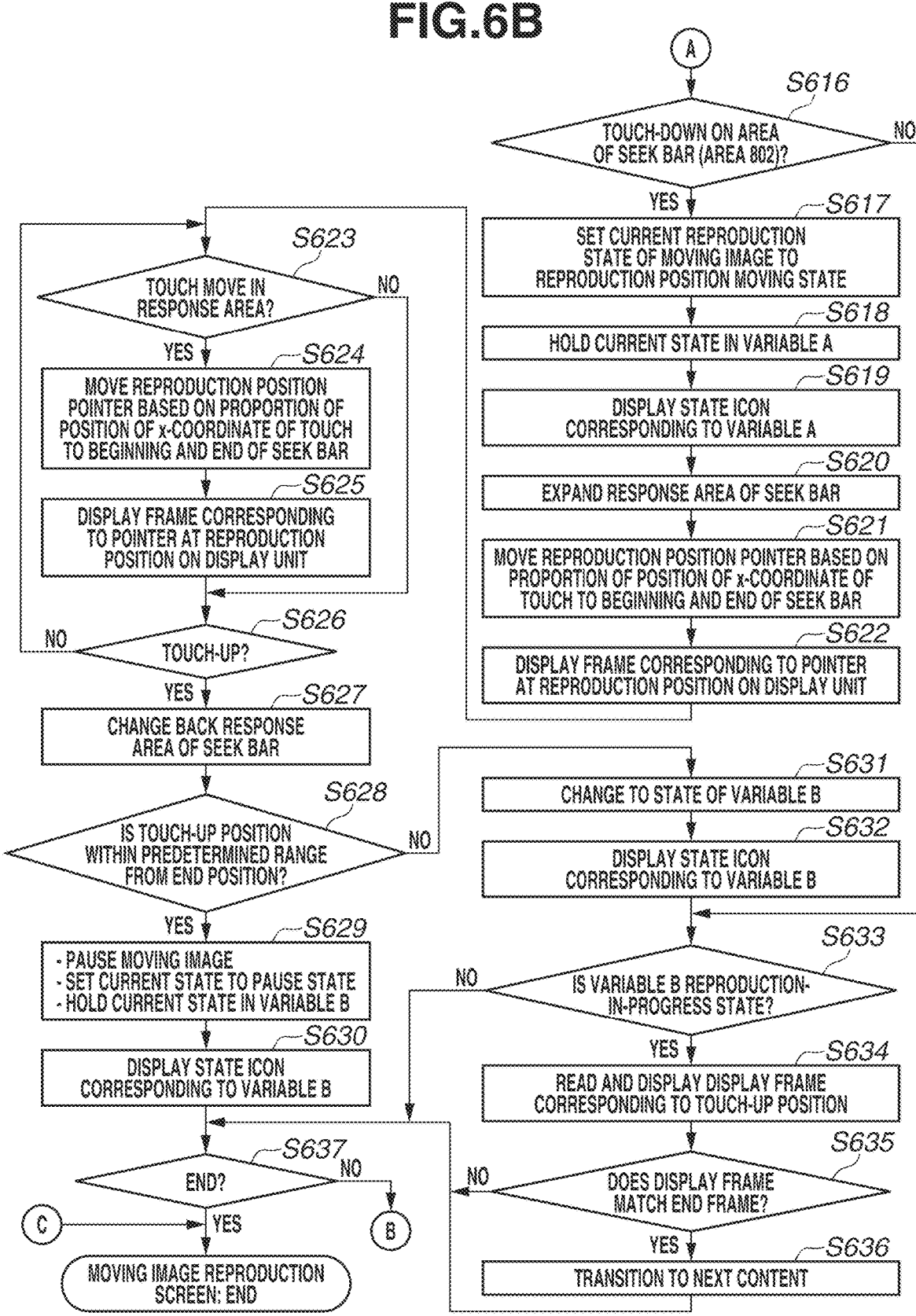

The flowchart in FIG. 6 (consisting of FIGS. 6A and 6B) is started in a state where the digital camera 100 is started, the medium button 112b is pressed, and a list (an index) of moving images recorded in the recording medium 107 is displayed on the display 105. On a setting menu screen, the user can set an automatic continuous reproduction setting to "enabled" or disabled. FIG. 6 is a control flowchart in a case where the automatic continuous reproduction setting is set to "enabled". The automatic continuous reproduction is the following function. In a case where a plurality of moving images is recorded in the recording medium 107, and in a state where one of the moving image is reproduced, if the reproduction position of the moving image reaches the end, the moving image that is being reproduced is ended and transitions to a next moving image, and the next moving image is reproduced. If there is not a next moving image, the reproduction is ended. The order of moving images to be automatically reproduced at this time may be the order of moving images displayed in the index, or may be the order of moving images associated with each other based on the contents of the moving images. The display of the index of moving images refers to the display of a list of a plurality of moving images on the display 105. A list of images corresponding to the first frames of the moving images is displayed. For example, a list of a total of twelve moving images in four columns and three rows is displayed per page on the display 105 so that an overview of the plurality of moving images can be visually confirmed in a simplified manner. The automatic continuous reproduction setting is saved in the non-volatile memory 103.

In step S600, the CPU 101 initializes variables A and B indicating the state of a moving image and holds the variables A and B in the memory 102.

In step S601, the CPU 101 determines whether any one of the moving images displayed in the index on the display 105 is selected. If any one of the moving images is selected (Yes in step S601), the processing proceeds to step S602. If not (No in step S601), the processing proceeds to step S603.

In step S602, the CPU 101 reads the moving image selected in step S601 from the recording medium 107 or starts acquiring the moving image via the Internet 110, and displays information regarding the moving image on the display 105. The information regarding the moving image refers to, for example, the time 202, the display 203, the timecode 205, and the timecode 206 in FIG. 2. The information to be displayed is not limited to this, and may also include camera parameters such as a shutter speed and an International Organization for Standardization (ISO) value when the moving image is recorded, and information regarding the lenses. Further, the resolution, the sound volume, and the color depth may also be displayed. Based on information such as the recording time of the moving image read from the recording medium 107, the CPU 101 performs control to display the seek bar 204 on the display 105. If the reproduction state of the moving image illustrated in FIG. 2 is the reproduction-in-progress state, the elapsed time (or the timecode) of the position of the pointer 207 is not displayed. The display 203 indicates the sequential number of the moving image that is being displayed on the display 105 among the moving images saved in the recording medium 107. Thus, the display 203 enables the prediction of the presence or absence of transition to a next content when the pointer 207 reaches the end of the seek bar 204. In the state illustrated in FIG. 2, since there is a content that can be reproduced next, continuous reproduction is automatically performed. If, on the other hand, the display 203 indicates "7/7", it is understood that the content that is being displayed on the display 105 is the last content, and there is not a content to be continuously reproduced next. Accordingly, in a case where the content is paused in step S629, the user can determine whether it is necessary to instruct the icon 301 in FIG. 3 to transition to a next content. Thus, if there is not a next content (the current content is the last content), the user can avoid performing an unnecessary operation.

In step S603, the CPU 101 determines whether an end operation is performed. If the end operation is performed (Yes in step S603), the control flowchart in FIG. 6 ends. If the end operation is not performed (No in step S603), the processing returns to step S601. The end operation refers to an operation for ending the control flowchart in FIG. 6, i.e., ending the moving image reproduction mode, and refers to the pressing of the medium button 112b in the present exemplary embodiment. If the medium button 112b is pressed, the moving image reproduction mode transitions to the image capturing standby state.

In step S604, the CPU 101 reads the moving image selected in step S601 from the recording medium 107. The image processing unit 104 decodes the corresponding moving image, and continuously displays the decoding result on the display 105, thereby starting the reproduction of the moving image. The frame rate of the moving image to be reproduced is set by the user or set in advance for the moving image, or the frame rate when the moving image is recorded is used. In step S604, the reproduction state of the moving image is set to the reproduction-in-progress state.

In step S605, the CPU 101 performs control to hold the current state in the variable B defined in the memory 102. More specifically, based on step S604, the CPU 101 holds the current reproduction state in the variable B.

In step S606, the CPU 101 performs control to display on the display 105 a state icon corresponding to the state of the variable B held in the memory 102. Since the reproduction state is held in the variable B in step S605, the CPU 101 displays "PLAY" indicating the reproduction-in-progress state as in the display 201 in FIG. 2.

In step S607, the CPU 101 refers to the variable B held in the memory 102 and determines whether the current reproduction state of the moving image is the reproduction-in-progress state. If the current reproduction state of the moving image is the reproduction-in-progress state (Yes in step S607), the processing proceeds to step S608. If not (No in step S607), the processing proceeds to step S611.

In step S608, the CPU 101 determines whether a touch-down on an image area of the touch panel 112a is performed. If the touch-down is performed (Yes in step S608), the processing proceeds to step S609. If the touch-down is not performed (No in step S608), the processing proceeds to step S615. The image area refers to an image area 801 illustrated in FIG. 8A. The image area 801 is an area of the touch panel 112a except for the bar area 802 within the touch panel 112a. In the present exemplary embodiment, the touch panel 112a and the display 105 are integrated, and an area where a touch operation can be performed is the entire display area of the display 105.

In step S609, the CPU 101 pauses the moving image, sets the reproduction state to the pause state, and holds the current reproduction state, i.e., the pause state, in the variable B held in the memory 102.

In step S610, the CPU 101 determines whether a touch-up from the touch panel 112a is performed. If the touch-up is performed (Yes in step S610), the processing proceeds to step S615. If the touch-down continues to be performed (No in step S610), the processing returns to step S610.

In step S611, since the determination is No in step S607, the CPU 101 determines whether a reproduction instruction is given. If the reproduction instruction is given (Yes in step S611), the processing proceeds to step S612. If not (No in step S611), the processing proceeds to step S615. The reproduction instruction refers to a touch operation on the icon 301 in FIG. 3 displayed on the display 105 or the pressing of a reproduction button (not illustrated) on which a pressing operation can be performed. In the present exemplary embodiment, the touch operation on the icon 301 is not limited to a touch-down on the display area of the icon 301, and a touch-down on any place in an area indicated by the image area 801 in FIG. 8A is regard as the reproduction instruction.

In step S612, in response to the touch-down by the user, the CPU 101 changes the display color of the icon 301 in FIG. 3 from gray to orange. The change in the display color enables the user to visually confirm that the touch operation of the user themselves is selecting the icon 301. Then, the user can understand that the reproduction state of the moving image transitions from the pause state to the reproduction-in-progress state by a touch-up. Although the display color of the icon 301 is changed in the present exemplary embodiment, any display form may be changed so long as the user can visually confirm that the user is selecting the icon 301.

In step S613, the CPU 101 determines whether a touch-up from the touch panel 112a is performed. If the touch-up is performed (Yes in step S613), the processing proceeds to step S614. If the touch-down continues to be performed (No in step S613), the processing returns to step S613.

In step S614, the CPU 101 reproduces the moving image, sets the reproduction state to the reproduction-in-progress state, and holds the current reproduction state, i.e., the reproduction-in-progress state, in the variable B held in the memory 102.

In step S615, the CPU 101 refers to the variable B held in the memory 102 and displays on the display 105 a state icon of the moving image corresponding to the state of the variable B. If the variable B is the reproduction-in-progress state, the CPU 101 displays "PLAY" as in the display 201 in FIG. 2. If the variable B is the pause state, the CPU 101 displays "PAUSE" as in the display 302 in FIG. 3.

In step S616, the CPU 101 determines whether a touch-down on the seek bar 204 displayed on the display 105, i.e., a touch-down on the bar area 802, is performed. If the touch-down is performed (Yes in step S615), the processing proceeds to step S617. If the touch-down is not performed (No in step S615), the processing proceeds to step S633.

In step S617, the CPU 101 pauses the moving image and sets the state to the reproduction position moving state of the moving image.

In step S618, the CPU 101 holds the state while the touch-down is performed on the touch panel 112a, i.e., the reproduction position moving state, in the variable A defined in the memory 102.

In step S619, the CPU 101 displays on the display 105 a state icon corresponding to the state of the variable A held in the memory 102. Although the state held in the variable A in step 619 is the reproduction position moving state, in the present exemplary embodiment, the CPU 101 displays "PAUSE" indicating the pause state as in the display 402 in FIG. 4 and the display 502 in FIG. 5. The display indicating the state is not limited to this. Alternatively, the display may be performed so that the user can understand that the current state is the reproduction position moving state, and the display may be different from both the display 201 in FIG. 2 and the display 302 in FIG. 3.

In step S620, the CPU 101 expands a response area of the seek bar 204. More specifically, the response area of the seek bar 204 that has been a range indicated by the bar area 802 is expanded in a y-direction into the movement area 803 illustrated in FIG. 8B. If the determination is Yes in step S616, i.e., the touch-down on the seek bar 204 (inside the bar area 802) is performed, the response area where a touch operation can be performed while the touch-down continues is set to the movement area 803. It is understood that the movement area 803 is expanded in the y-direction as compared with the bar area 802 as the response area before the touch-down on the seek bar 204 illustrated in FIG. 8A is performed. The y-direction refers to a direction perpendicular to the direction in which the pointer 207 proceeds on the seek bar 204. In the present exemplary embodiment, the response area is not expanded in the x-direction, and is expanded in the entire display 105 in the y-direction. In step S620, the response area in the x-direction is made one size larger than the entire length in the x-direction of the seek bar 204. In this way, even if the finger of the user moves out of the movement area 803 while the user is performing a touch move, and it is determined that a touch-up is performed, the pointer 207 reaches either of the beginning and the end of the seek bar 204. Thus, the user is unlikely to feel user-unfriendly. The response area is thus expanded, whereby, when the user moves the reproduction position by operating the pointer 207 on the seek bar 204, a touch-up unintended by the user is unlikely to occur. In this way, it is possible to reduce the display and the start of the reproduction of a content at a position not desired by the user.

In step S621, the CPU 101 reads the x-direction coordinate of the touch-down position in step S616 and moves the pointer 207 on the seek bar 204 corresponding to the read position in the memory 102. The x-direction refers to a direction perpendicular to the y-direction.

In step S622, the CPU 101 displays on the display 105 a frame indicated by the timecode value of the moving image corresponding to the pointer 207. The timecode value of the moving image corresponding to the pointer 207 is calculated using, for example, the following method.

An example of the method for calculating the timecode value corresponding to the display position of the pointer 207 on the seek bar 204 is illustrated below.

$$\left\{ \frac{x - \text{coordinate of touch} - x - \text{coordinate of beginning of seek bar}}{\text{size in } x - \text{direction of entire seek bar}} \times (\text{end timecode value} - \text{beginning timecode value}) \right\} + \text{beginning timecode value}$$ [Formula 1]

In step S623, the CPU 101 determines whether a touch move is performed in the movement area 803 of the touch panel 112a. If the touch move is performed (Yes in step S623), the processing proceeds to step S624. If not (No in step S623), the processing proceeds to step S626.

In step S624, similarly to step S621, the CPU 101 reads the x-coordinate of the touch position in step S616 and moves the pointer 207 on the seek bar 204 corresponding to the read position in the memory 102.

In step S625, similarly to step S622, the CPU 101 displays on the display 105 a frame indicated by the timecode value of the moving image corresponding to the display position of the pointer 207. The timecode value of the moving image corresponding to the pointer 207 is calculated using the calculation method illustrated in step S622.

In step S626, the CPU 101 determines whether a touch-up from the touch panel 112a is performed. If the touch-up is performed (Yes in step S626), the processing proceeds to step S627. If the touch continues (No in step S626), the processing returns to step S623. The touch-up in step S626 includes both the determination as a touch-up from the touch panel 112a performed by the user and the determination as a touch-up by moving the finger 310 of the user out of the movement area 803.

In step S627, the CPU 101 changes back the response area of the seek bar 204 expanded in step S620 from the movement area 803 to the bar area 802 as the original response area.

In step S628, the CPU 101 determines whether the touch-up position in step S626 is within a predetermined range from the display position of the end of the seek bar 204. If the touch-up position is within the predetermined range (Yes in step S628), the processing proceeds to step S629. If the touch-up position is outside the predetermined range (No in step S628), the processing proceeds to step S631. The position of a touch-up by a user operation does not necessarily match a position intended by the user. Even if the user thinks that the user has performed a touch-up operation to reach the end of the seek bar 204, the touch-up position may not strictly match the display position of the end of the seek bar 204. Thus, if the touch-up position is within the predetermined range from the end of the seek bar 204, it is determined that the user performs the touch-up at the end of the seek bar 204. The predetermined range at this time is set in such a manner that the difference in time between the display frame calculated from the touch-up position and the end frame is, for example, about a second. The predetermined range may be a fixed value determined in advance. Alternatively, the longer the moving image is, the greater the predetermined range may be. Yet alternatively, the predetermined range may be variable corresponding to the speed of the touch move of the user. To make a more strict determination, the display frame corresponding to the touch-up position may be calculated using the calculation method described in step S621, and it may be determined whether the difference between the display frame and the end frame is within the predetermined range.

In step S629, the CPU 101 pauses the moving image that is being displayed on the display 105, and holds the pause state as the reproduction state in the variable B. Since the determination is Yes in step S628, it can be assumed that the user moves the pointer 207 to the end of the seek bar 204. As described above, in the control flowchart in FIG. 6, a setting is made so that if the pointer 207 reaches the end frame of the moving image that is being reproduced on the display 105, the moving image automatically transitions to a next moving image, and the reproduction of the next moving image is started. Thus, according to the setting, the reproduction of a next moving image is automatically started unintentionally in step S629. In such control, however, even though the user wishes to reproduce and confirm the last portion of the moving image that is being displayed on the display 105, the moving image transitions to the next moving image against the user's intention. This creates the need to give an instruction to return to the moving image that the user originally wishes to confirm. Consequently, the user may feel user-unfriendly.

In step S630, the CPU 101 displays a state icon on the display 105 corresponding to the state of the variable B held in the memory 102. More specifically, a display as in the display 302 in FIG. 3 is performed on the display 105.

In step S631, the CPU 101 changes the state of the moving image to the state of the variable B held in the memory 102. Since the determination is No in step S628, it is understood that the touch-up is performed on the pointer 207 by the user operation at a position outside the predetermined range from the end of the seek bar 204. Accordingly, sufficient frames that can be reproduced still remain in the moving image that is being displayed on the display 105. Thus, there is some time until the moving image transitions to a next moving image as made in the above automatic continuous reproduction setting. Thus, before the moving image transitions to the next moving image, the user can confirm a display frame at a desired position in the moving image, and therefore, the phenomenon that the user feels user-unfriendly as described in step S629 does not occur. Thus, the state of the moving image is changed back to that before the user performs the touch-down operation on the touch panel 112a. In this way, the moving image that has been reproduced before the touch-down operation is performed is reproduced without an additional operation by the user also after the touch operation ends. The moving image that has been paused before the touch operation is performed continues to be paused also after the touch operation ends.

In step S632, the CPU 101 displays a state icon on the display 105 corresponding to the state of the variable B held in the memory 102. If the variable B is the reproduction-in-progress state, a display as in the display 201 in FIG. 2 is performed. If the variable B is the pause state, a display as in the display 302 in FIG. 3 is performed.

In step S633, the CPU 101 determines whether the state of the variable B held in the memory 102 is the reproduction-in-progress state. If the state of the variable B is the reproduction-in-progress state (Yes in step S633), the processing proceeds to step S634. If the state of the variable B is the pause state (No in step S633), the processing proceeds to step S637.

In step S634, the CPU 101 calculates and reads the display frame corresponding to the touch-up position in step S626 and displays the display frame on the display 105. Thus, the CPU 101 reproduces the moving image from the display frame corresponding to the touch-up position.

In step S635, the CPU 101 determines whether the display frame that is being displayed on the display 105 matches the end frame indicated by the end timecode value. If the display frame matches the end frame (Yes in step S635), the processing proceeds to step S636. If the display frame does not match the end frame (No in step S635), the processing proceeds to step S637.

In step S636, the CPU 101 reads from the recording medium 107 a next moving image after the moving image that is being reproduced, and reproduces the next moving image. Since the determinations are Yes in steps S633 and S635, it is understood that the moving image displayed on the display 105 is being reproduced, and the display frame (pointer 207) reaches the end frame as a result of the progress of the reproduction not by a user operation. Thus, as described above, just as the automatic continuous reproduction setting, the CPU 101 reproduces the next moving image. By such a control, the user can move the reproduction position of a moving image (content) displayed on the display 105 to a desired position. If the automatic continuous reproduction setting is set to "enabled", the user can efficiently view a plurality of contents continuously without an operation by the user.

In step S637, the CPU 101 determines whether the user performs an end operation for ending the moving image reproduction mode. If the end operation is performed (Yes in step S637), this control flowchart ends. If not (No in step S637), the processing returns to step S607. The end operation for ending the moving image reproduction mode refers to the pressing of the medium button 112b or the power button 112d.

Even in the middle of the control process in FIG. 6, if the medium button 112b or the power button 112d is operated, the control flowchart ends (the moving image reproduction mode ends). More specifically, if the medium button 112*b* is pressed, the moving image reproduction mode transitions to the image capturing standby state. If the power button 112*d* is operated, the digital camera 100 is turned off.

Figure 7:
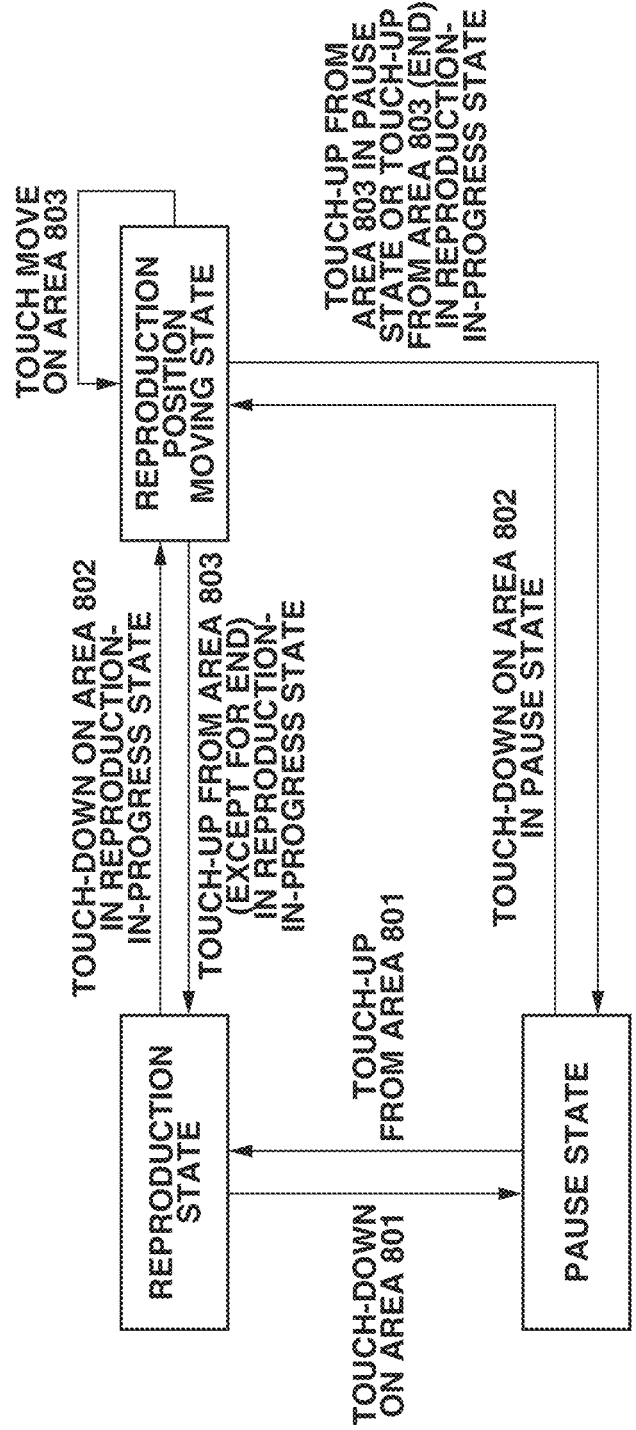
FIG. 7 is a transition diagram illustrating state transition of the content.

FIG. 7 is a diagram illustrating state transitions in which the CPU 101 can transition during the reproduction of a moving image in the present exemplary embodiment. An example of the state transitions is as described above in the control flowchart in FIG. 6.

In the present exemplary embodiment, an example has been described where the seek bar 204 is operated by a touch operation on the touch panel 112*a*, to change the reproduction position of a moving image as a content. The operation, however, is not limited to the touch operation so long as the reproduction position of the moving image can be changed. For example, in an arrow key on which upper, lower, left, and right portions can be pushed in (four-direction key), if the right portion or the left portion is pushed in once, the moving image is fast-forwarded or rewound 10 seconds. If the right portion or the left portion is held down for a certain time, the pointer 207 moves. Then, if the pushing in is released at a timing desired by the user, the reproduction position can be moved (changed) to a desired position. Similarly, in a case where an operation member is included on which a rotational operation can be performed, the pointer 207 may be moved in the right direction by performing a clockwise rotational operation on the operation member, and the pointer 207 may be moved in the left direction by performing a counterclockwise rotational operation on the operation member. In the above description, the reproduction position is changed by performing a touch operation on the seek bar 204 or an operation on the pointer 207. Alternatively, although, in the above-description, the reproduction position is changed by the touch operation on the seek bar 204 or the operation on the pointer 207, the reproduction position may be changed by jumping any seconds by quickly performing a tap operation twice (double tap) on the touch panel 112*a*. In a case where a pressing detection panel capable of detecting a pressing force is included, the change speed of the reproduction position may be changed based on the level of the pressing of the pressing detection panel. In any of the methods, in the state where the content is being reproduced, if the reproduction position reaches the end frame by an operation of the user, control is performed so that the content is paused without transitioning to a next content even if the automatic continuous reproduction is set. The content is not limited to a moving image, and examples of the content also include music and a voice message. The operation unit 112 may be a character information input device such as a keyboard, a pointing device such as a mouse or a touch panel, a button on which a pressing operation can be performed, a dial on which a rotational operation can be performed, or a joystick on which direction indication can be performed in eight directions.

A case is considered where a range slightly wider than the predetermined range described in step S628 is provided, i.e., the touch-up position is a position outside the predetermined range from the end of the seek bar 204 of the display position (the touch-up position cannot be regarded as the display position of the end) but somewhat close to the end of the seek bar 204 of the display position. In such a case, for example, suppose that the difference in time between the display frame corresponding to the touch-up position and the end frame is three seconds. At this time, since the determination is No in step S628, if the reproduction state before the touch operation is performed is the reproduction-in-progress state, the moving image after the touch-up is performed is reproduced even if the remaining reproduction time of the moving image is a short time, for example, three seconds. However, since the reproduction time after the touch-up is performed is a short time, such as three seconds, the user may feel that the moving image transitions to a next moving image immediately after the touch-up as the setting of the automatic continuous reproduction. On the other hand, a case is also possible where the user wishes to start the reproduction of the moving image at the position where the remaining reproduction time is three seconds, and intentionally performs the touch-up at this position. In such a case, if the moving image is paused in response to the touch-up, the user may feel annoyed. Thus, a range wider than the predetermined range described in step S628 is provided, and a control is performed so that if a touch-up is performed within the wider range, the moving image is not paused immediately after the touch-up (the moving image is reproduced), and if the display frame reaches the end frame, the moving image is paused. Alternatively, without gradually providing ranges between the touch-up position and the display position of the end of the seek bar 204, the predetermined range in step S628 may be made somewhat wide, and the above control may be performed.

Even though the automatic continuous reproduction setting is set to "enabled" in step S629, if the content is paused at the end, an icon as in the icon 301 in FIG. 3 is displayed. This can notify the user that the content that is being displayed on the display 105 is paused, and does not transition to the reproduction of a next content. If there is a next content when the content is paused even though the automatic continuous reproduction is set to "enabled", an instruction is given to the icon 301 displayed in a superimposed manner on the content, whereby the content transitions to the reproduction of the next content. In other words, the content does not transition to the reproduction of the next content until the user gives a new instruction. The content is thus paused until a clear intention of the user is confirmed, whereby the content does not transition against the user's intention. The content may transition to the next content not only by performing a touch operation on a touch icon as in the icon 301, but also by performing a flick operation on the touch panel 112*a* or by pushing in the above described arrow key. More specifically, by performing a flick operation in a direction from the right to the left or pushing in the right portion of the arrow key, the content transitions to the next content. By performing a flick operation in a direction from the left to the right or pushing in the left portion of the arrow key, the content transitions to a previous content.

In the flowchart in FIG. 6, a description has been given of the control process in a case where the automatic continuous reproduction is set to "enabled". With reference to a part of FIG. 6, a description can also be given of a case where the automatic continuous reproduction is set to "disenabled". Specifically, a control is performed so that in FIG. 6, steps S628 to S630, S635, and S636 are skipped, the processing proceeds from step S627 to step S631, and the processing proceeds from step S634 to step S637. If the automatic continuous reproduction is set to "disenabled", then regardless of whether the position of a touch-up by the user is within the predetermined range from the end frame, and in response to the fact that the reproduction position of the moving image that is currently being displayed on the display 105 has reached the end frame, the reproduction of the moving image is ended. At this time, as described above, the icon 301 in FIG. 3 is displayed in a superimposed manner on the moving image. In response to the fact that the user gives a new instruction, for example, by performing a touch operation on the icon 301, the moving image does not transition to a next moving image, but is reproduced from the beginning of the moving image displayed on the display 105 (the same moving image is reproduced again from the beginning).

As described in FIG. 2 to FIGS. 8A and 8B, in the present exemplary embodiment, a control is performed so that if the automatic continuous reproduction is set to "enabled" for a plurality of contents and the reproduction position of a content moves to the end of the content by a user operation, the automatic continuous reproduction of a next content is not performed.

Normally, in a case where a change operation for changing the reproduction position of the content is performed by the user, and if the reproduction state of the content is the reproduction-in-progress state before the user operation is performed, the content is set to the reproduction-in-progress state also after the operation is completed, and if the reproduction state of the content is the pause state before the user operation is performed, the content is set to the pause state also after the operation is completed. If, however, the automatic continuous reproduction is set to "enabled" and the reproduction position of the content is regarded as having moved to the end of the indicator by the user operation, the content that is being reproduced is ended and transitions to a next content as the setting of the automatic continuous reproduction. If the user considers reproducing and confirming the last portion of the content displayed on the display 105, this transition is against the user's intention, and the user may find it hard to use this device. For this reason, in the present exemplary embodiment, in the state where the reproduction position reaches (or is regarded as reaching) the end frame by a user operation, if the user operation ends, the content is paused at the end of the indicator even if the automatic continuous reproduction is set to "enabled". In this way, the user can thoroughly confirm a desired content. In a case where the reproduction progresses by a user operation after the user operation ends at the position of a frame sufficiently before the end frame, and the reproduction position reaches the end frame, the content automatically transitions to a next content if the automatic continuous reproduction is set to "enabled".

If the user wishes to ultimately create a single long-time moving image such as a movie, the user may capture and record a moving image by dividing the moving image into a plurality of chapters, and connect these chapters by editing. A photographer as the user is highly likely to wish to edit each chapter as a single moving image in a state intended by the user. This may create the need to confirm a portion near the end of each moving image more finely and wait for an excellent timing for the user. In such a case, even though the user considers intentionally confirming the portion near the end of each moving image, if the moving image transitions to a next content without the user's permission, the user may feel annoyed. If, on the other hand, the automatic continuous reproduction is not set, the user cannot determine whether editing is necessary or unnecessary because the user cannot check if the end of a moving image (chapter) that is currently being displayed is naturally connected to the beginning of a next moving image (next chapter). For these reasons, according to the situation, a control is performed depending on a case where the automatic continuous reproduction of a content is to be performed and a case where the automatic continuous reproduction of a content is not to be performed.

A description has been given of the method for, if the display frame to which the reproduction position moves is the end frame, setting the reproduction state to the pause state. Alternatively, if a content that is being reproduced and a next content are strongly related to each other, then as an exception, the content may not be paused, thereby achieving continuous reproduction. Specifically, possible examples of "strongly related to each other" include a case where the recording dates and times of the contents are on the same day or within a predetermined period (e.g., within three days), or a case where the locations where the contents are recorded are within a predetermined distance (e.g., within a radius of 1 km).

The various types of control performed by the CPU 101 in the above description may be performed by a single piece of hardware, or may be performed by a plurality of pieces of hardware (e.g., a plurality of processors or circuits) sharing the processing, thereby controlling the entire apparatus.

While the present invention has been described in detail based on its suitable exemplary embodiments, the present invention is not limited to these specific exemplary embodiments. The present invention also includes various forms without departing from the spirit and scope of the invention. Further, the above-described exemplary embodiments merely illustrate exemplary embodiments of the present invention, and can also be appropriately combined.

In the above-described exemplary embodiments, as an example, a case has been described where the present invention is applied to the digital camera 100. The present invention, however, is not limited to this example, and is applicable to a display control apparatus capable of reproducing a content such as a moving image, sound, music, a slide show, or text. More specifically, the present invention is applicable to a personal computer (PC), a personal digital assistant (PDA), a mobile phone terminal, a mobile image viewer, a printer apparatus including a display, a digital photo frame, a music player, a game apparatus, and an electronic book reader. A content saved in the recording medium 107 connected to the digital camera 100 is read and displayed on the display 105. The present invention, however, is not limited to this, and is also applicable to a case where a content saved in a cloud or contents on a moving image posting site uploaded by various users are reproduced (reproduced in a streaming manner) via the Internet 110.

The present invention is applicable not only to an imaging apparatus main body but also to a control apparatus that communicates with an imaging apparatus (including a network camera) through wired or wireless communication and remotely controls the imaging apparatus. Examples of the apparatus that remotely controls the imaging apparatus include apparatuses such as a smartphone, a tablet PC, and a desktop PC. Based on operations performed in the control apparatus or processes performed in the control apparatus, the control apparatus notifies the imaging apparatus of commands to perform various operations and make various settings and thereby can remotely control the imaging apparatus. Further, the control apparatus may be able to receive a live view image captured by the imaging apparatus through wired or wireless communication and display the live view image.

Other Exemplary Embodiments

The present invention can be achieved also by performing the following process. This is the process of supplying software (program) for achieving the functions of the above-described exemplary embodiments to a system or an apparatus via a network or various recording media, and of causing a computer (or a CPU or a microprocessor unit (MPU)) of the system or the apparatus to read and execute a program code. In this case, the program and a recording medium that stores the program constitute the present invention.

According to the present invention, it is possible to prevent transition of a content against a user's intention, thereby improving usability for the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-134128, filed Aug. 6, 2020, which is hereby incorporated by reference herein in its entirety.

What is claimed is:

1. A display control apparatus comprising:
at least one memory and at least one processor which function as:
a reproduction unit configured to reproduce a content; and
a control unit configured to, in a state where the content is reproduced, perform control so that
in a case where a reproduction position of the content is changed to a first range from an end of the content by an operation of a user on an operation unit, the reproduction is continued from a position where the change is made, and in a case where the reproduction position of the content reaches the end of the content, the reproduction automatically transitions to reproduction of a next content, and
in a case where the reproduction position of the content is changed to a second range from the end of the content different from the first range by an operation of the user on the operation unit, and even in a case where the reproduction position of the content reaches the end of the content, the reproduction does not automatically transition, to the reproduction of the next content and the reproduction of the content is paused.

2. The display control apparatus according to claim 1, in a case where the reproduction position of the content is changed to the second range by an operation of the user, the control unit pauses the reproduction of the content at the end of the content.

3. The display control apparatus according to claim 1,
wherein the at least one memory and the at least one processor further function as a setting unit configured to make a setting of whether the reproduction is to transition to the reproduction of the next content without an instruction from the user in a case where the reproduction position of the content reaches the end of the content, and
wherein the control unit performs the control, in a case where the setting is made to be enabled by the setting unit.

4. The display control apparatus according to claim 3, wherein in a case where the reproduction position of the content is changed to the second range and in a case where a new instruction is given by the user after the reproduction of the content is paused at the end of the content, the control unit controls the reproduction to transition to the reproduction of the next content in a case where the setting is made to be enabled by the setting unit, and controls the reproduction of the content from a beginning in a case where the setting is made to be disabled by the setting unit.

5. The display control apparatus according to claim 1, wherein the content is at least one of a content read from a recording medium connected to the display control apparatus and a content acquired via a network.

6. The display control apparatus according to claim 1, wherein the control unit displays an indicator indicating information regarding the reproduction of the content on a screen and changes the reproduction position of the content by an operation of the user on the indicator using the operation unit.

7. The display control apparatus according to claim 6, wherein the indicator includes bar display indicating a time of the content and a pointer indicating the reproduction position of the content.

8. The display control apparatus according to claim 6, wherein the control unit displays at least one of the indicator, a state display indicating a state of the content, and a timecode of the content together with the content on the screen.

9. The display control apparatus according to claim 1, wherein the content includes a plurality of contents, and the control unit displays an item indicating presence or absence of a next content to which the content can transition, together with the content, on a screen.

10. The display control apparatus according to claim 1, further comprising an image capturing unit,
wherein the content is acquired by the image capturing unit capturing an image.

11. The display control apparatus according to claim 1, wherein the operation unit is an operation member configured to detect a pressing operation, or a touch operation member configured to detect a touch operation.

12. The display control apparatus according to claim 11, wherein the control unit makes a range where a touch operation can be performed wider, while a touch operation on the touch operation member is performed, than before the touch operation on the touch operation member is performed.

13. The display control apparatus according to claim 1, wherein the control unit changes, in a state where the reproduction of the content is paused, in response to a start of an operation on the operation unit, a display form of an icon indicating that the content is reproduced, and the control unit reproduces the content, in response to an end of the operation on the operation unit.

14. The display control apparatus according to claim 1, wherein the content is a moving image including a plurality of frames, and
wherein the reproduction unit displays, in response to a change in the reproduction position of the content, a frame corresponding to the reproduction position and reproduces the moving image.

15. The display control apparatus according to claim 1, wherein the content is at least one of a moving image, a sound, and a music.

16. The display control apparatus according to claim 1, wherein in at least one of a case where a date and time when the content is recorded and a date and time when the next content is recorded are within a predetermined period, and a case where a location where the content is recorded and a location where the next content is recorded are within a predetermined distance, and even in a case where the reproduction position is changed to the second range by an operation of the user on the operation unit, the control unit controls the reproduction to transition to the reproduction of the next content in a case where the reproduction position reaches the end of the content.

17. A control method for controlling a display control apparatus, the control method comprising:
reproducing a content; and
performing control, in a state where the content is reproduced, so that
in a case where a reproduction position of the content is changed to a first range by an operation of a user on an operation unit, the reproduction is continued, from the position where the change is made, and in a case where the reproduction position reaches the end of the content, the reproduction automatically transitions, to reproduction of a next content, and
in a case where the reproduction position of the content is changed to a second range different from the first range by an operation of the user on the operation unit and even in a case where the reproduction position reaches the end of the content, the reproduction does not automatically transition to the reproduction of the next content and the reproduction of the content is paused.

18. A non-transitory computer-readable recording medium that stores a program for causing a computer to execute a control method for a display control apparatus, the control method comprising:
reproducing a content; and
performing control, in a state where the content is reproduced, so that
in a case where a reproduction position of the content is changed to a first range by an operation of a user on an operation unit, the reproduction is continued, from the position where the change is made, and in a case where the reproduction position reaches the end of the content, the reproduction automatically transitions, to reproduction of a next content, and
in a case where the reproduction position of the content is changed to a second range different from the first range by an operation of the user on the operation unit and even in a case where the reproduction position reaches the end of the content, the reproduction does not automatically transition to the reproduction of the next content and the reproduction of the content is paused.

* * * * *